(12) United States Patent
Suzuki et al.

(10) Patent No.: US 9,150,150 B2
(45) Date of Patent: Oct. 6, 2015

(54) INTERIOR ILLUMINATION LAMP FOR VEHICLE

(75) Inventors: Ken Suzuki, Makinohara (JP); Ryohei Ochiai, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 178 days.

(21) Appl. No.: 13/808,302

(22) PCT Filed: Aug. 3, 2011

(86) PCT No.: PCT/JP2011/068208
§ 371 (c)(1),
(2), (4) Date: Jan. 4, 2013

(87) PCT Pub. No.: WO2012/018139
PCT Pub. Date: Feb. 9, 2012

(65) Prior Publication Data
US 2013/0107562 A1 May 2, 2013

(30) Foreign Application Priority Data
Aug. 3, 2010 (JP) .................................. 2010-174657

(51) Int. Cl.
*B60Q 1/00* (2006.01)
*B60Q 1/26* (2006.01)
(Continued)

(52) U.S. Cl.
CPC ................. *B60Q 3/00* (2013.01); *B60Q 3/0203* (2013.01)

(58) Field of Classification Search
CPC ............. F21S 8/02; F21S 8/024; F21S 8/026; F21V 3/00; F21V 17/14; F21V 21/04; B61Q 3/0296; B61Q 3/0203

USPC ......... 362/490, 492, 493, 488, 576, 479, 147, 362/364, 365
See application file for complete search history.

(56) References Cited

U.S. PATENT DOCUMENTS 6,749,324 B2 * 6/2004 Nagai et al. .................... 362/490
6,799,875 B2 * 10/2004 Flokstra et al. ............... 362/521
(Continued)

FOREIGN PATENT DOCUMENTS

DE 10 2008 046 983 A1 4/2009
JP 2005-75023 A 3/2005
(Continued)

OTHER PUBLICATIONS

Office Action, dated Jun. 3, 2014, issued by the Japanese Patent Office in counterpart Japanese Patent Application No. 2010-174657.
(Continued)

*Primary Examiner* — Thomas A Hollweg
*Assistant Examiner* — Kevin Quarterman
(74) *Attorney, Agent, or Firm* — Sughrue Mion, PLLC

(57) ABSTRACT

There is provided an interior illumination lamp for a vehicle. In the interior illumination lamp for a vehicle including a lamp unit having a light source, which is a functional part, and a lens provided inside a vehicle room, which is a decorative part, the lens is engaged with the lamp unit through an inner peripheral edge of an opening in a roof trim, thereby to clamp the roof trim between them and to attach the interior illumination lamp for a vehicle in a state where the roof trim is clamped. The lamp unit is provided with a plurality of positioning projections at a position where the lamp unit is contacted with the roof trim.

7 Claims, 4 Drawing Sheets

(51) Int. Cl.
  *B60Q 3/00* (2006.01)
  *B60Q 3/02* (2006.01)

(56) References Cited

U.S. PATENT DOCUMENTS

| | | | |
|---|---|---|---|
| 7,322,722 B2 * | 1/2008 | Hartmann et al. | 362/365 |
| 2005/0083700 A1 | 4/2005 | Okabe et al. | |
| 2008/0170400 A1 | 7/2008 | Maruyama | |
| 2009/0073707 A1 | 3/2009 | Nagai et al. | |

FOREIGN PATENT DOCUMENTS

| | | | |
|---|---|---|---|
| JP | 2006-248297 A | 9/2006 | |
| JP | 2007-203911 A | 8/2007 | |
| JP | 2007-210545 A | 8/2007 | |
| JP | 2008-155752 A | 7/2008 | |
| JP | 2008-170729 A | 7/2008 | |
| JP | 2009-143531 A | 7/2009 | |

OTHER PUBLICATIONS

Communication dated Apr. 14, 2014 issued by the Korean Intellectual Property Office in counterpart Korean Patent Application No. 10-2013-7002871.

Communication dated Jan. 20, 2014, issued by the Korean Intellectual Property Office in corresponding Application No. 10-2013-7002871.

International Search Report (PCT/ISA/210) dated Oct. 31, 2011, issued by the International Searching Authority in International Application No. PCT/JP2011/068208.

Written Opinion (PCT/ISA/237) dated Oct. 31, 2011, issued by the International Searching Authority, in International Application No. PCT/JP2011/068208.

Communication dated Jul. 25, 2014 from the Korean Intellectual Property Office in a counterpart Korean application No. 10-2013-7002871.

Communication dated Aug. 4, 2014 issued by the State Intellectual Property Office of People's Republic of China in counterpart Chinese application No. 201180038022.1.

Notice to Submit Response dated Oct. 22, 2014 issued by Korean Intellectual Property Office in counterpart Korean Patent Application No. 10-2014-7023992.

Office Action dated Dec. 10, 2014, issued by the German Patent Office in counterpart German Application No. 11 2011 102 589.0.

Trial Decision dated Jun. 1, 2015 issued by Korean Intellectual Property Office in counterpart Korean Application No. 2013-7002871.

Office Action dated Apr. 26, 2015, issued by the Korean Intellectual Property Office in counterpart Korean Application No. 10-2014-7023992.

Office Action dated Apr. 8, 2015, issued by the State Intellectual Property Office of P.R. China in counterpart Chinese Application No. 201180038022.1.

* cited by examiner (A)

(B)

(C)

(A)

(B)

INTERIOR ILLUMINATION LAMP FOR VEHICLE

TECHNICAL FIELD

The present invention relates to an interior illumination lamp for a vehicle, and more particularly, to a structure for preventing looseness of the interior illumination lamp for a vehicle with respect to a roof trim.

BACKGROUND ART

As an interior illumination lamp for a vehicle to be attached to a roof trim of a ceiling in a vehicle room, the interior illumination lamp for a vehicle as disclosed in JP-A-2007-203911 has been known.

Japanese Patent Publication No. JP-A-2007-203911 is discussed below.
<The Interior Illumination Lamp for a Vehicle Disclosed in JP-A-2007-203911>

An object of the interior illumination lamp for a vehicle disclosed in JP-A-2007-203911 is to enhance its assembling workability and to facilitate maintenance works. For this purpose, specifically, in the interior illumination lamp for a vehicle which is composed of a functional part and a decorative part, a locking claw is formed on a side face of a base housing of the decorative part, and an elastically deformable operating panel having a locking part to which the locking claw can be locked is provided in a housing of the functional part. The operating panel is pressed from an inside of a bulb containing room in the decorative part to be elastically deformed, thereby enabling a locked state of the locking part with respect to the locking claw to be released.
<Merit and Demerit of the Interior Illumination Lamp for a Vehicle Disclosed in JP-A-2007-203911>
<<Merit>>

According to the interior illumination lamp for a vehicle disclosed in JP-A-2007-203911, a lamp unit can be reliably assembled to a ceiling panel having a plurality of clamping thicknesses, only by exchanging clamping holders. Therefore, constituent components of the lamp unit and a basic design of a wire harness which is connected to the lamp can be commonly used, and further, specs of the clamping holder can be exchanged according to the ceiling panel to which the lamp unit is to be attached. As the results, there is such a merit that modification of the specs of the components to comply with diversification of the specs of the lamp unit can be restrained to the least extent, and cost for the components can be reduced.
<<Demerit>>

In case where the interior illumination lamp for a vehicle is assembled by a clamp between a roof trim and a lens, utilizing the art in JP-A-2007-203911, it is necessary to mold a whole contact face of the lens to be contacted with the roof trim with high precision, for enhancing an appearance of a mated part of an outer periphery of a decorative surface of the lens to be mated with the roof trim. This incurs an increase of the cost.

SUMMARY OF THE INVENTION

Technical Problem

Object of the Invention

This invention has been made in order to solve the above described drawback, and an object of the invention is to provide an interior illumination lamp for a vehicle in which there is no necessity of molding a whole contact face of a decorative part to be contacted with a roof trim with high precision, whereas an appearance of a mated part of an outer periphery of a decorative surface of a lens to be mated with the roof trim can be easily enhanced, and looseness of the mated part is eliminated.

Solution to Problem

In order to attain the above described object, a first invention of this application relates to an interior illumination lamp for a vehicle including a lamp unit having a light source, which is a functional part, and a lens provided inside a vehicle room, which is a decorative part, wherein the lens is engaged with the lamp unit through an inner peripheral edge of an opening in a roof trim, thereby to clamp the roof trim between them and to attach the interior illumination lamp for a vehicle in a state where the roof trim is clamped, characterized in that the lamp unit is provided with a plurality of positioning projections at a position where the lamp unit is contacted with the roof trim.

Moreover, a second invention of this application is characterized in that a plurality of the positioning projections are provided at an equal interval, in the first invention.

Advantageous Effect of Invention

According to the first invention, there is no necessity of molding the whole contact face of the decorative part to be contacted with the roof trim with high precision, whereas the appearance of the mated part of the outer periphery of the decorative surface of the lens to be mated with the roof trim can be easily enhanced, and looseness of the mated part is eliminated. As the results, reduction of the cost can be achieved.

According to the second invention, the positioning projections are provided at an equal interval, and hence, the appearance of the mated part between the decorative part and the roof trim can be further enhanced, and the looseness is eliminated.

DESCRIPTION OF EMBODIMENTS

Figure 1:
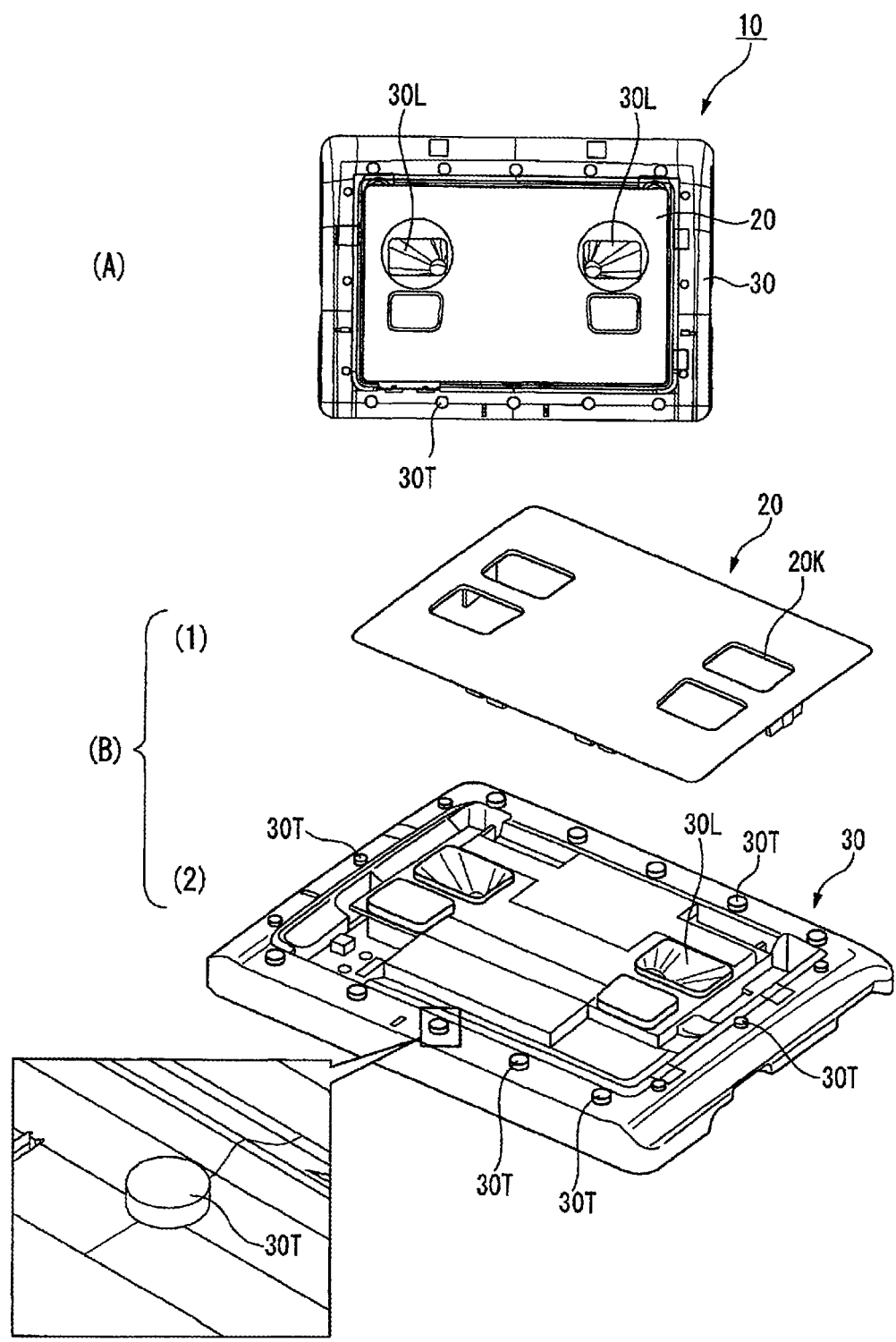
FIG. 1(A) is a plan view for explaining an interior illumination lamp for a vehicle according to the invention.
FIG. 1(B) is an exploded perspective view of the interior illumination lamp for a vehicle in FIG. 1(A).

Now, the interior illumination lamp for a vehicle according to the invention, in which there is no necessity of molding a whole contact face of a decorative part to be contacted with a roof trim with high precision, whereas an appearance of a mated part of an outer periphery of a decorative surface of a lens to be mated with the roof trim can be easily enhanced, and looseness of the mated part is eliminated, will be described referring to the drawings.

<Structure of the Interior Illumination Lamp for a Vehicle According to the Invention>

FIG. 1(A) is a plan view for explaining the interior illumination lamp for a vehicle according to the invention, and FIG. 1(B) is an exploded perspective view of a lens (1) and a lamp unit (2) detached from the interior illumination lamp for a vehicle in FIG. 1(A). An enlarged view of a part extracted from (2) shows a positioning projection which is provided according to the invention.

In FIG. 1, an interior illumination lamp 10 for a vehicle according to the invention includes a lens 20 provided inside a vehicle room, which is a decorative part, and a lamp unit having light sources 30L, which is a functional part.

FIG. 1(B) shows a state where the lens 20 is detached from the interior illumination lamp 10 for a vehicle. Openings 20K for the light sources are formed in the lens 20. Both the lens 20 and the lamp unit 30 have a rectangular shape. The lens 20 is smaller in size than the lamp unit 30, and an outer periphery of the lamp unit 30 is exposed from an outer periphery of the lens 20 in a state where the lens 20 is assembled to the lamp unit 30. According to the invention, a plurality of positioning projections 30T are provided at an equal interval in an exposed part of the lamp unit 30.

Each of the positioning projections 30T has a columnar shape, and is formed with high precision. In FIG. 1, the positioning projections 30T are provided at sixteen positions in total, specifically, at five positions on a longer side of the rectangular shape, and at three positions on a shorter side.

<Attachment of the Interior Illumination Lamp for a Vehicle According to the Invention>

Figure 2:
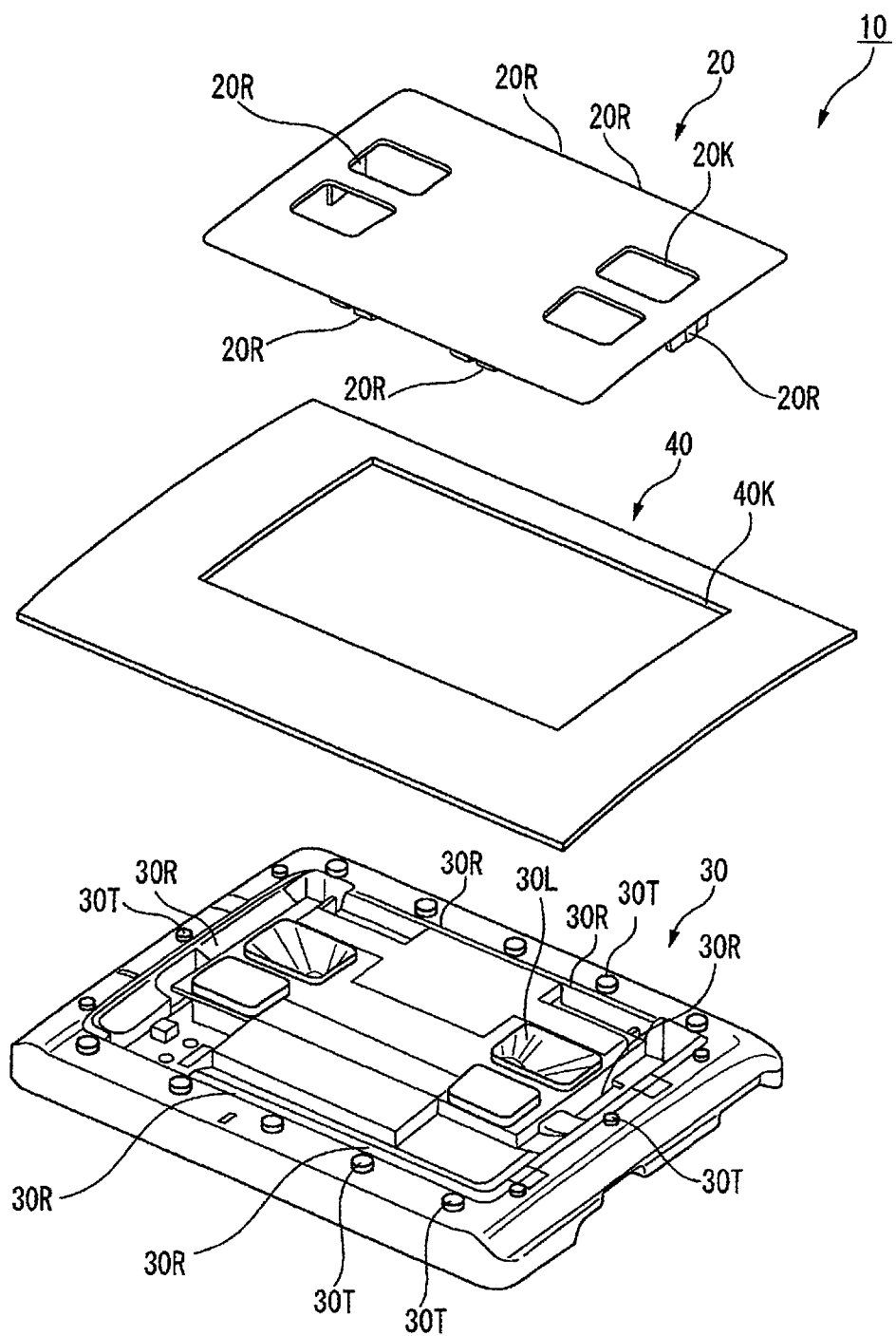
FIG. 2 is a perspective view showing a manner of attaching the interior illumination lamp for a vehicle in FIG. 1 to a ceiling of a vehicle.
Figure 4:
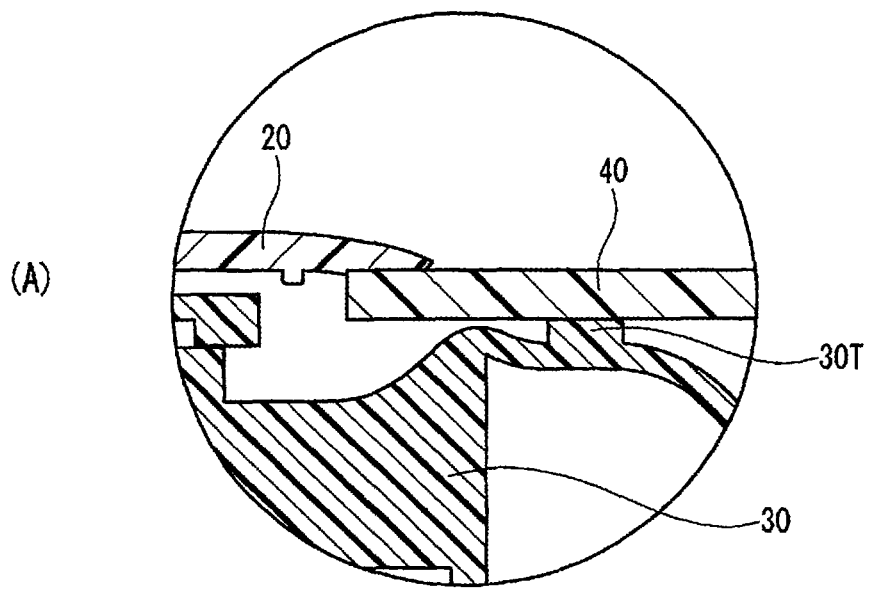
FIG. 4(A) is an enlarged view of an encircled part in FIG. 3(B)
FIG. 4(B) is an enlarged view of an encircled part in FIG. 3(C).
Figure 4:
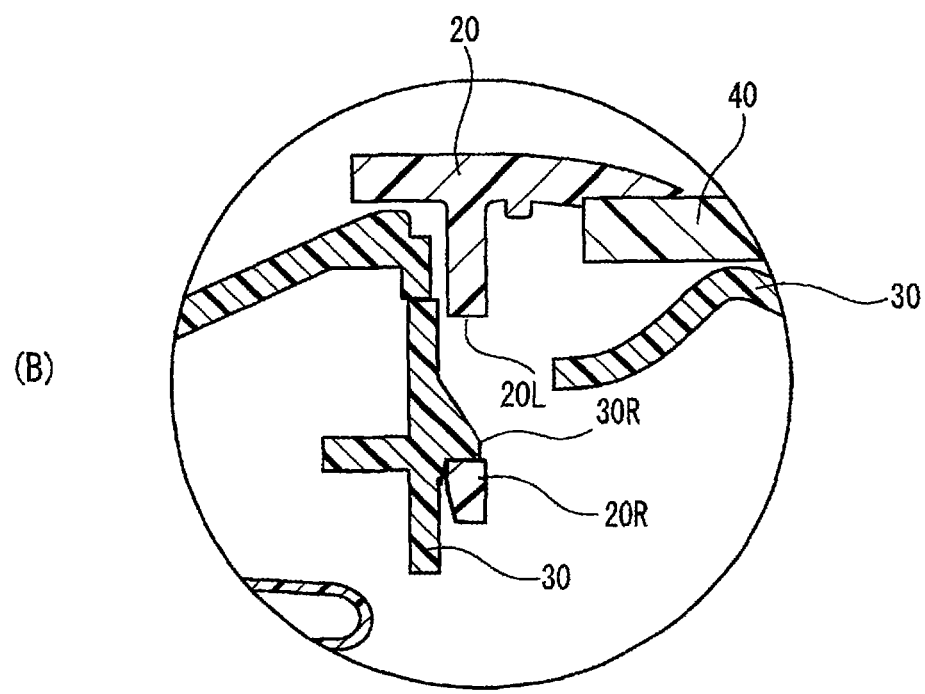

FIG. 2 is a perspective view showing a manner of attaching the interior illumination lamp 10 for a vehicle in FIG. 1 to a ceiling of a vehicle. After the lens 20 is detached from the interior illumination lamp 10 for a vehicle, as shown in FIG. 1B, a roof trim 40 is disposed between the lens 20 and the lamp unit 30. Then, the lens 20 is moved near the lamp unit 30, and locking parts 20R (specifically, refer to FIG. 4) of the lens 20 are passed through an opening 40K for the lens in the roof trim 40 to be engaged with locking parts 30R (specifically, refer to FIG. 4) of the lamp unit 30 at the opposite side, thereby to hold the roof trim 40 by clamping it between the lens 20 and the lamp unit 30 like a sandwich.

<Engagement Between the Lens 20 and the Lamp Unit 30>

Figure 3:
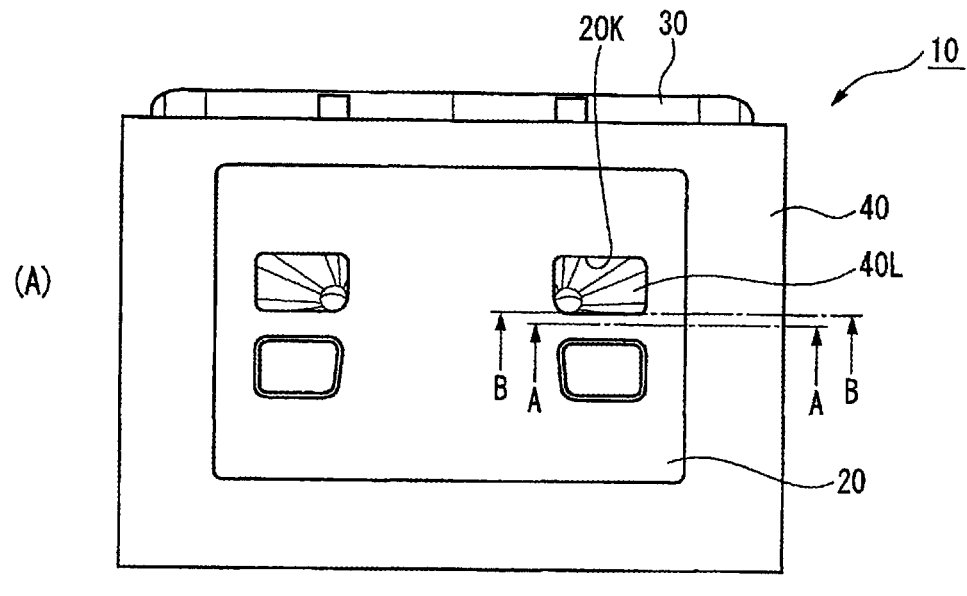
FIG. 3(A) is a plan view of the interior illumination lamp for a vehicle, showing a position where a roof trim is clamped and held between a lens and a lamp unit.
FIG. 3(B) is a vertical sectional view taken along a line A-A in FIG. 3A.
FIG. 3(C) is a vertical sectional view taken along a line B-B in FIG. 3(A).
Figure 3:
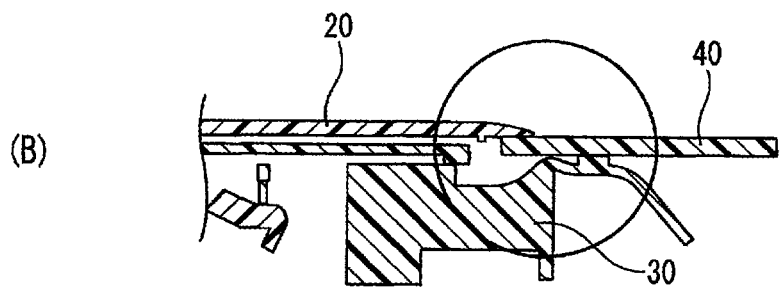
Figure 3:
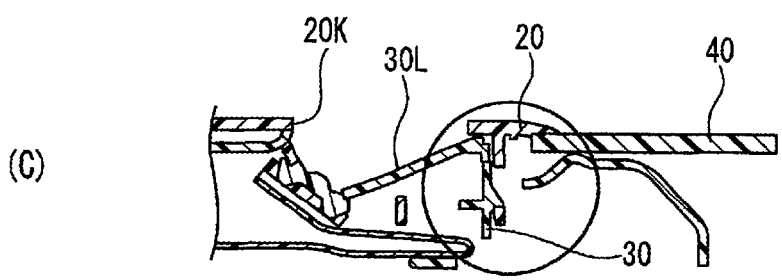

FIG. 3(A) is a plan view of the interior illumination lamp 10 for a vehicle, showing a region where the roof trim 40 is held in a state clamped between the lens 20 and the lamp unit 30 like a sandwich, FIG. 3(B) is a vertical sectional view taken along a line A-A in FIG. 3(A), and FIG. 3(C) is a vertical sectional view taken along a line B-B in FIG. 3(A). FIG. 4(A) is an enlarged view of an encircled part in FIG. 3(B), and FIG. 4(B) is an enlarged view of an encircled part in FIG. 3(C).

In FIGS. 3(C) and 4(B), the locking part 30R in a hook-like shape of the lamp unit 30 enters into an opening 20L which is formed in the locking part 20R of the lens 20 to be engaged with the locking part 20R. In this manner, by engaging the locking part 30R of the lamp unit 30 with the locking part 20R of the lens 20, the roof trim 40 is clamped between the lens 20 and the lamp unit 30, like a sandwich, and reliably held.

<Contact Between the Roof Trim 40 and the Positioning Projection 30T>

In a state where the lens 20 is engaged with the lamp unit 30, as shown in FIGS. 3C and 4B, an edge part of the lens 20 is in contact with an upper face of the roof trim 40 without a clearance, as shown in FIGS. 3B and 4A, and on a back side of the roof trim 40 (a lower side in the drawings), the roof trim 40 is in contact with the positioning projections 30T according to the invention which are provided on a peripheral edge of the lamp unit 30. Because the edge part of the lens 20 is in contact with the roof trim 40 without a clearance, the appearance is enhanced, and the looseness is eliminated. This utterly depends on whether or not the positioning projections 30T are precisely formed.

According to the invention, only the positioning projections 30T have to be precisely formed, and thus, contact area with the roof trim can be reduced. As the results, the appearance of a mated part between the outer periphery of the decorative surface of the lens and the roof trim is enhanced, and the looseness is eliminated.

To the contrary, in the conventional device, in order to improve the appearance by bringing the edge part of the lens into contact with the roof trim without a clearance, it has been necessary to form the lens precisely along an entire circumference (360 degree) of the lamp unit, and the production has been difficult.

The present application is based on Japanese Patent Application No. 2010-174657, filed on Aug. 3, 2010, the entire contents of which are incorporated herein by reference.

INDUSTRIAL APPLICABILITY

As described above, according to the invention, only by setting the positioning projections at desired positions in the outer peripheral part of the lamp unit 30, the contact area with the roof trim can be reduced. As the results, by molding only the positioning projections with high precision, the appearance of the mated part between the outer periphery of the decorative surface of the lens and the roof trim is enhanced, and the looseness is eliminated. Therefore, the necessity of molding the whole contact face of the decorative part with respect to the roof trim with high precision, which has been the problem of the conventional device, is eliminated, and reduction of the cost can be achieved.

REFERENCE SIGNS LIST

10 Interior illumination lamp for a vehicle according to the invention
20 Lens
20K Opening for light source
20R Locking part (opening)
30 Lamp unit
30L Light source
30R Locking part (hook)
30T Positioning projection
40 Roof trim
40K Opening for Lens

The invention claimed is:
1. An interior illumination lamp for a vehicle comprising:
a lamp unit having a light source, which is a functional part, and
a lens provided inside a vehicle room, which is a decorative part, wherein the lens is engaged with the lamp unit through an inner peripheral edge of an opening in a roof trim, thereby to clamp the roof trim and to attach the interior illumination lamp for a vehicle in a state where the roof trim is clamped,
wherein the lamp unit is provided with a plurality of positioning projections at a position where the lamp unit is contacted with the roof trim and the lens is integrally formed with a locking part, which directly extends from the lens, which is configured to lock with a locking part of the lamp unit.

2. An interior illumination lamp for a vehicle as claimed in claim 1, wherein a plurality of the positioning projections are provided at an equal interval.

3. The interior illumination lamp for a vehicle according to claim 1, wherein the positioning projections are contacted with a sealing side of the roof trim.

4. The interior illumination lamp for a vehicle according to claim 1, wherein an outer periphery of the lamp unit is exposed from an outer periphery of the lens in a state where the lens is assembled to the lamp unit.

5. The interior illumination lamp for a vehicle according to claim 1, wherein each of the positioning projections comprises a columnar shape.

6. The interior illumination lamp for a vehicle according to claim 1, wherein the lamp unit comprises sixteen positioning projections such that a long side of the lamp unit has five of the positioning projections and a short side, shorter than the long side, has 3 positioning projections.

7. The interior illumination lamp for a vehicle according to claim 1, wherein there is no space between the lens and the roof trim where the lens overlaps the roof trim.

* * * * *